United States Patent [19]
Ori

[11] Patent Number: 5,872,658
[45] Date of Patent: Feb. 16, 1999

[54] ZOOM LENS SYSTEM

[75] Inventor: Yuichiro Ori, Moriyama, Japan

[73] Assignee: Minolta Co., Ltd., Osaka, Japan

[21] Appl. No.: 794,561

[22] Filed: Feb. 3, 1997

[30] Foreign Application Priority Data

Feb. 6, 1996 [JP] Japan ..................................... 8-019784

[51] Int. Cl.$^6$ ........................... G02B 15/14; G02B 27/44;
G02B 3/08; G02B 13/18
[52] U.S. Cl. ........................... 359/677; 359/565; 359/576;
359/589; 359/685; 359/686; 359/687; 359/692;
359/708; 359/724; 359/742
[58] Field of Search ..................................... 359/565, 576,
359/589, 676, 677, 685, 686, 687, 691,
692, 708, 724, 741–743

[56] References Cited

U.S. PATENT DOCUMENTS 5,629,799    5/1997    Maruyama et al. ..................... 359/565

Primary Examiner—Georgia Epps
Assistant Examiner—Evelyn A. Lester
Attorney, Agent, or Firm—Price Gess & Ubell

[57] ABSTRACT

A zoom lens system includes, from the object to image side, a first lens unit of a positive refractive power having a first lens element with a power to both diffract and refract light. A second lens unit has a negative refractive power and may include a second lens element having both the power to diffract and refract light, and it least a third lens unit is included. A zooming operation is performed by varying the distances between the respective first, second, and third lens units.

20 Claims, 9 Drawing Sheets

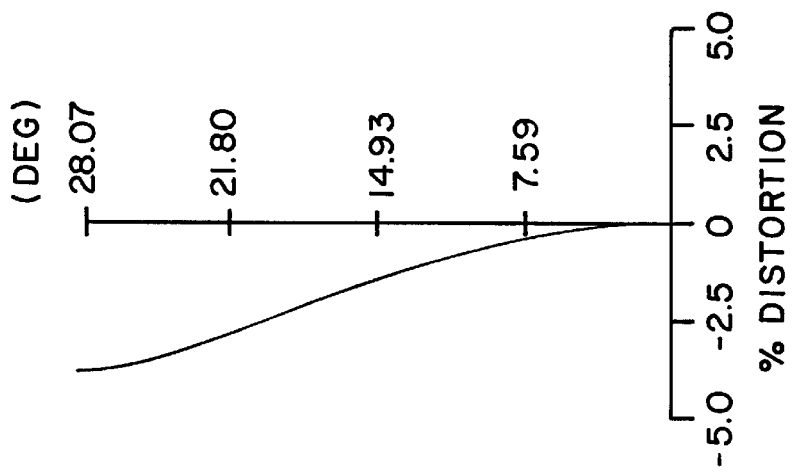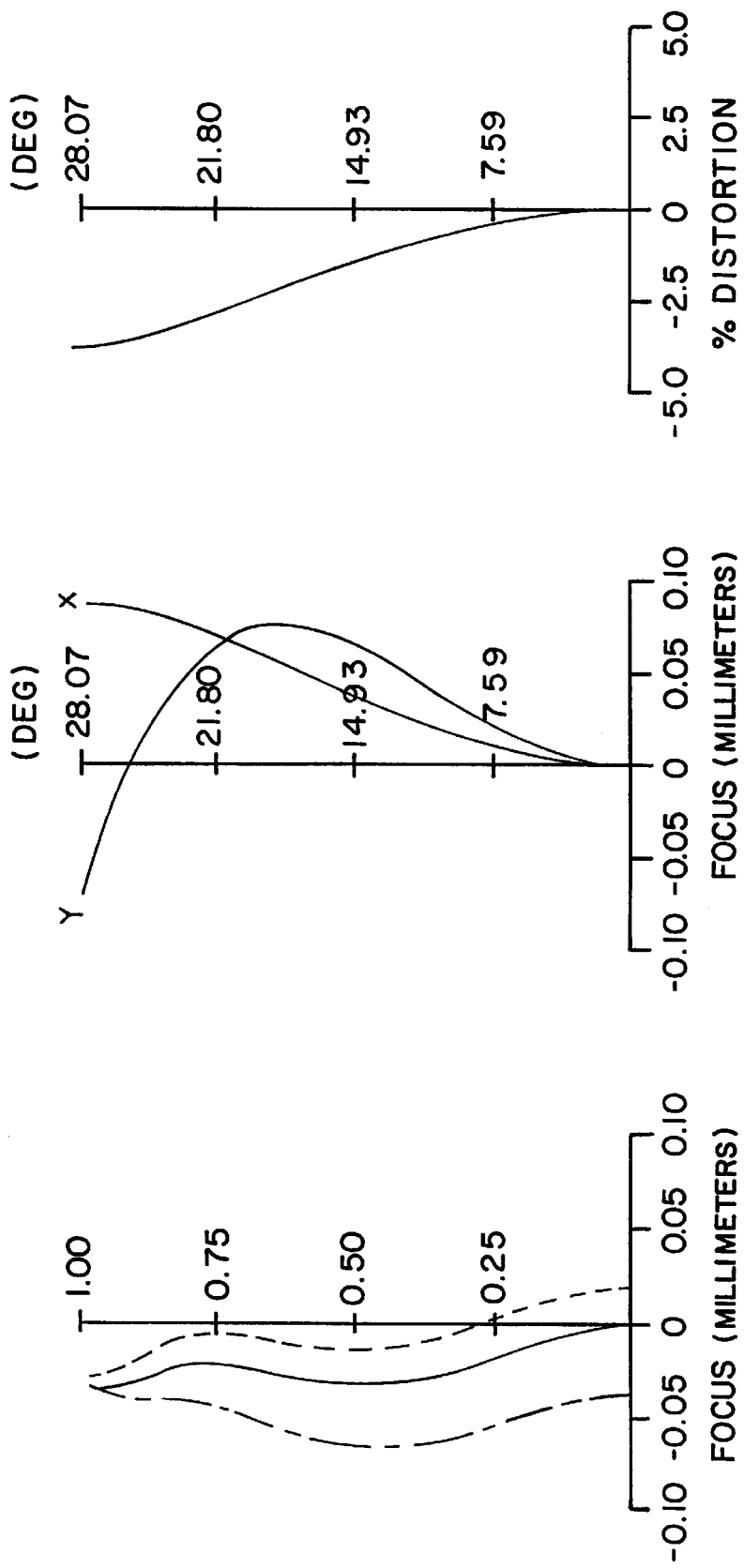

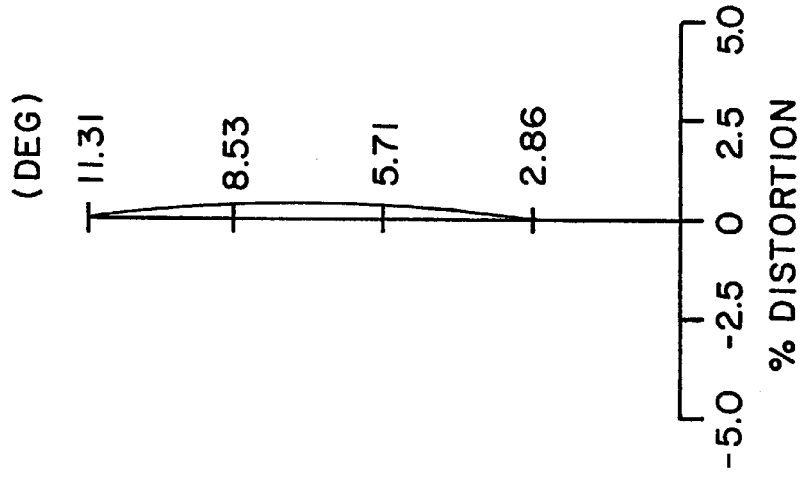
FIG. 3F DISTORTION
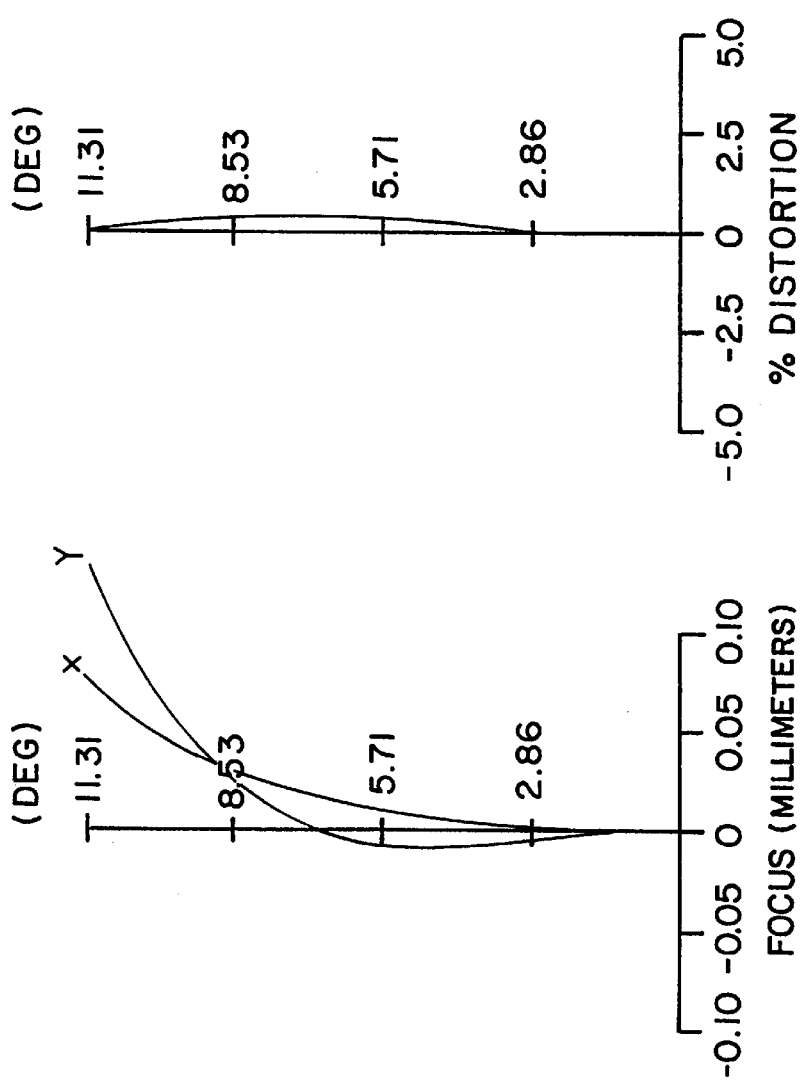
FIG. 3E ASTIGMATIC FIELD CURVES
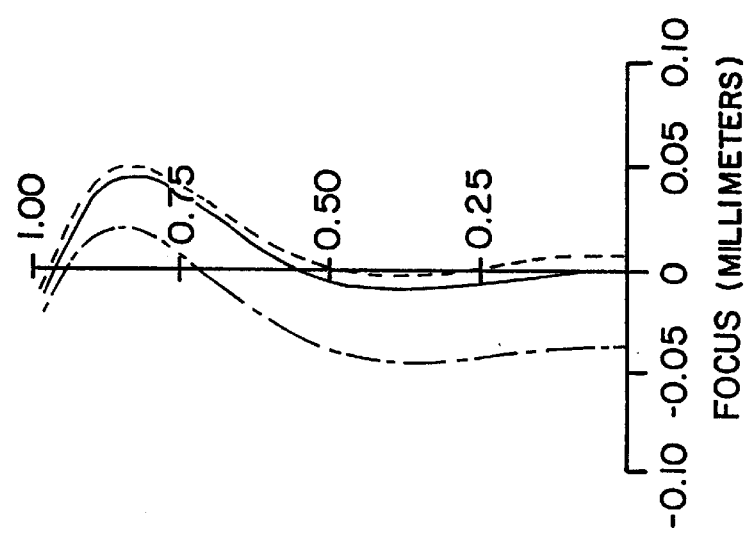
FIG. 3D LONGITUDINAL SPHERICAL ABER.

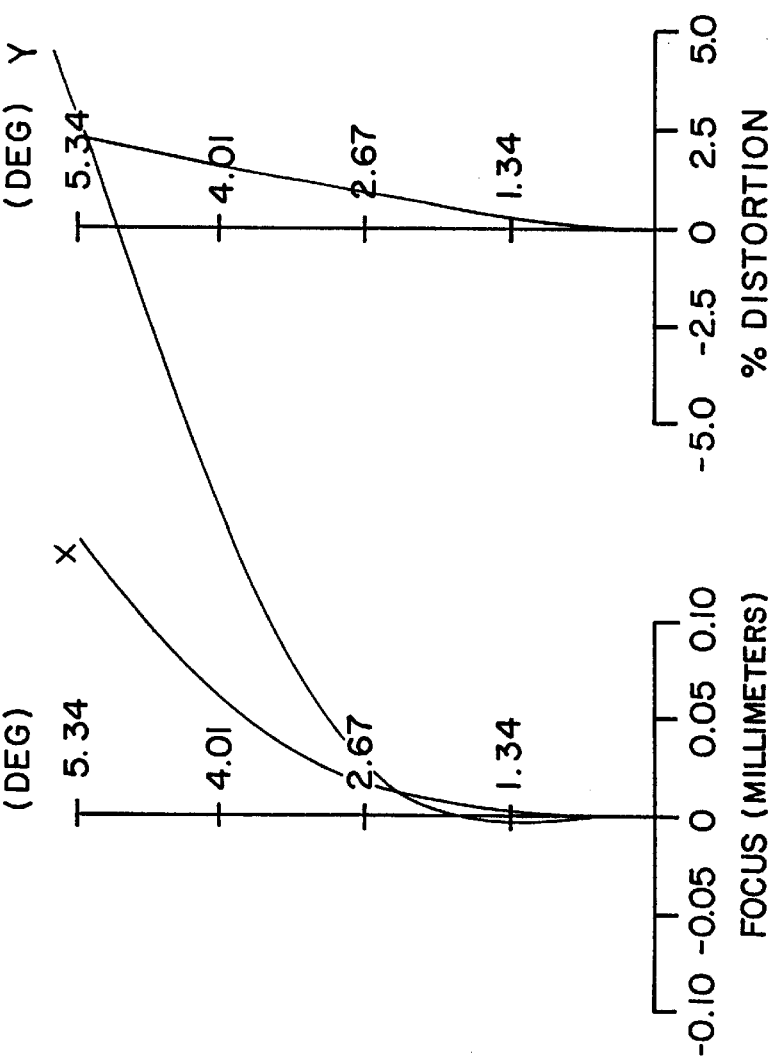
FIG. 3G LONGITUDINAL SPHERICAL ABER.
FIG. 3H ASTIGMATIC FIELD CURVES
FIG. 3I DISTORTION

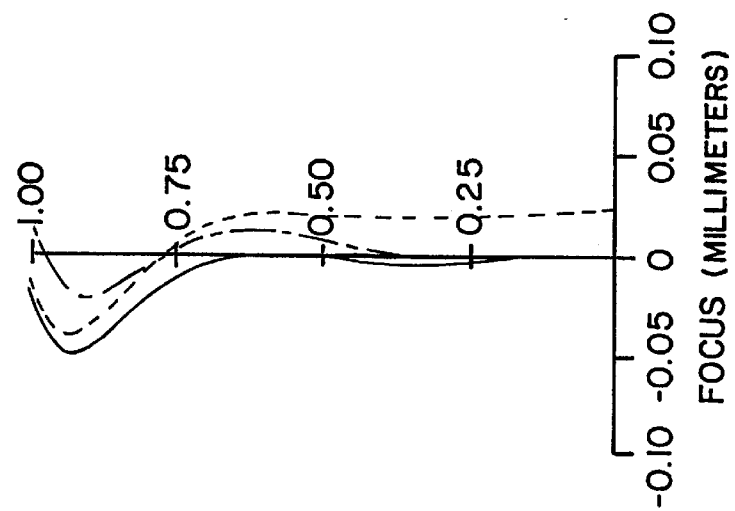
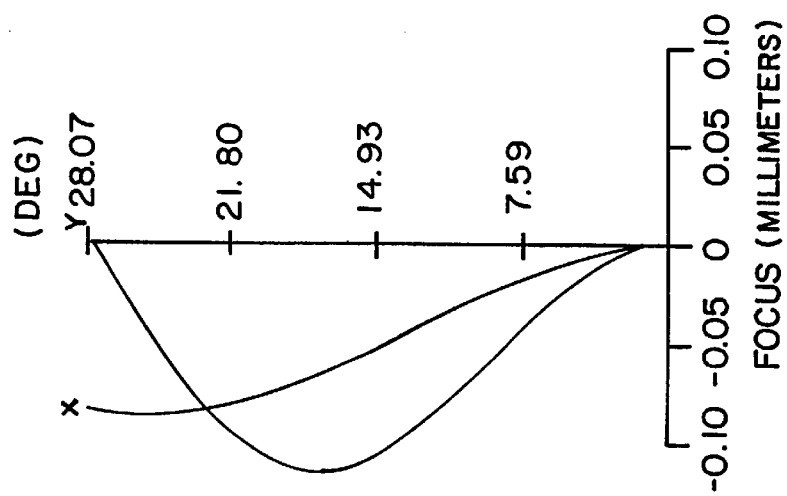
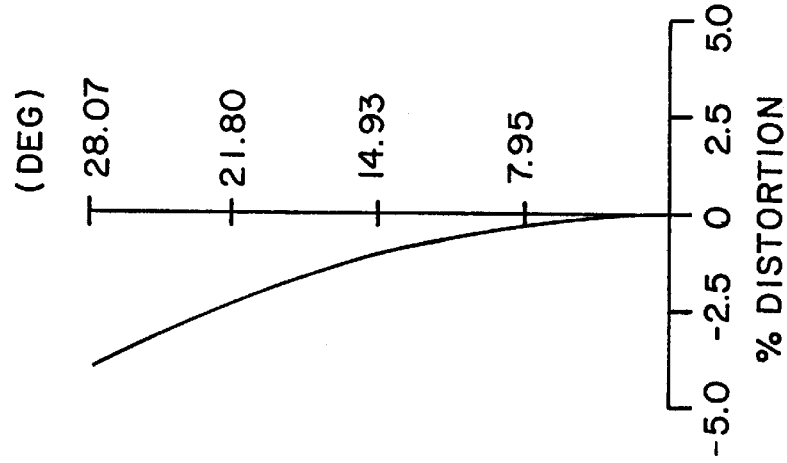

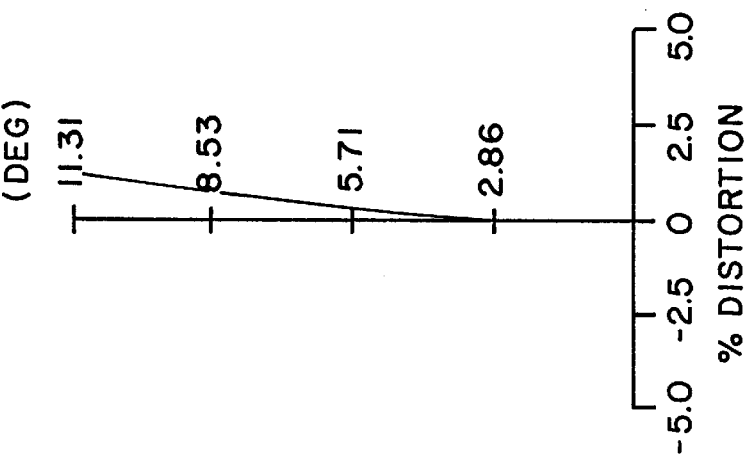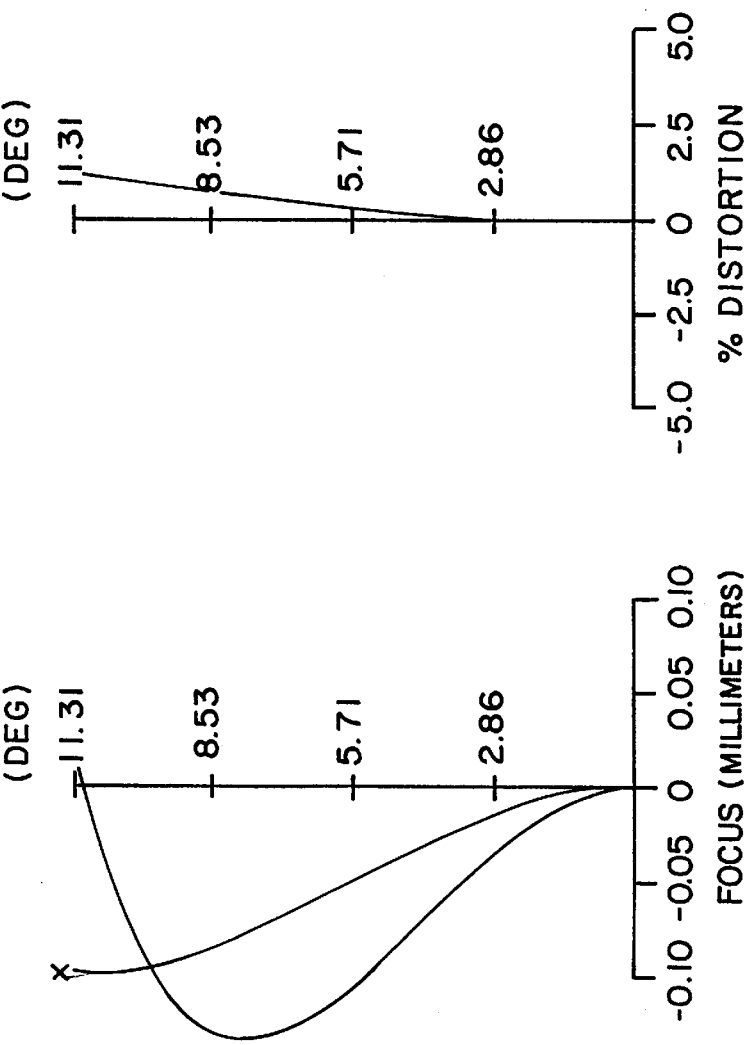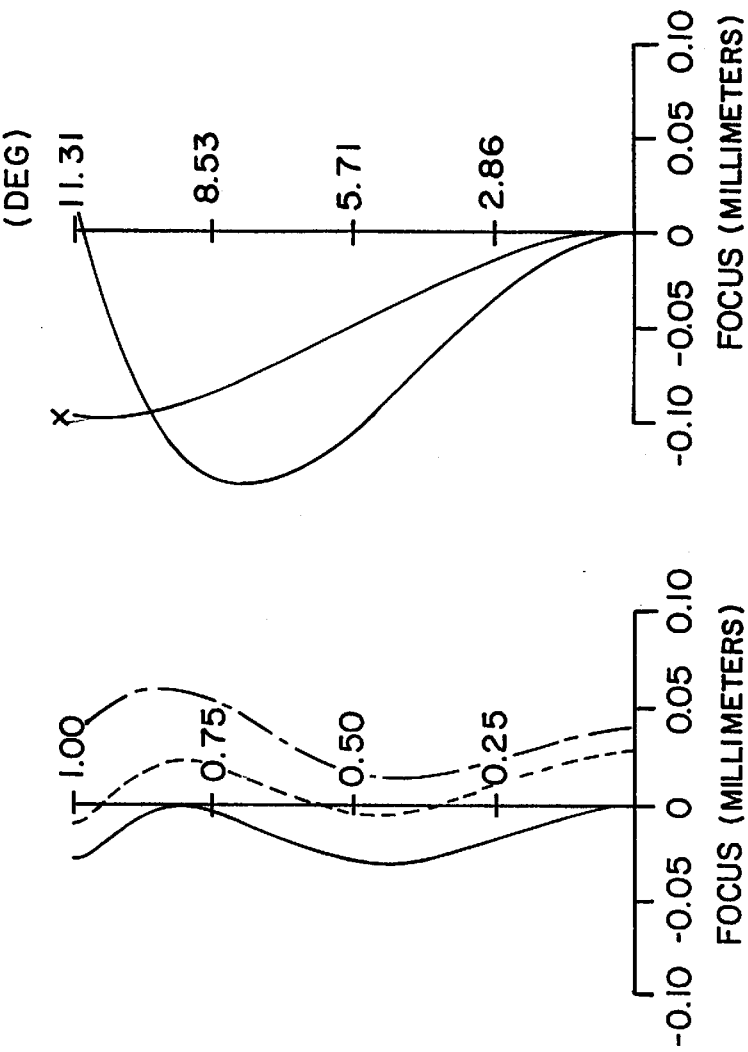

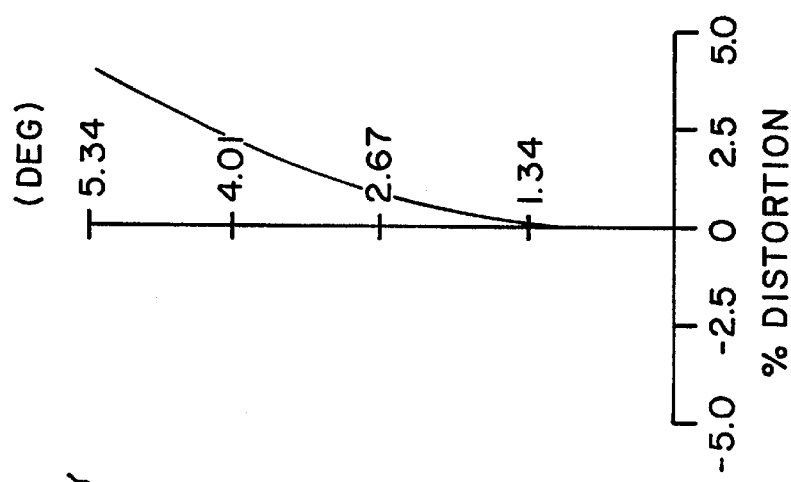
FIG. 4I DISTORTION
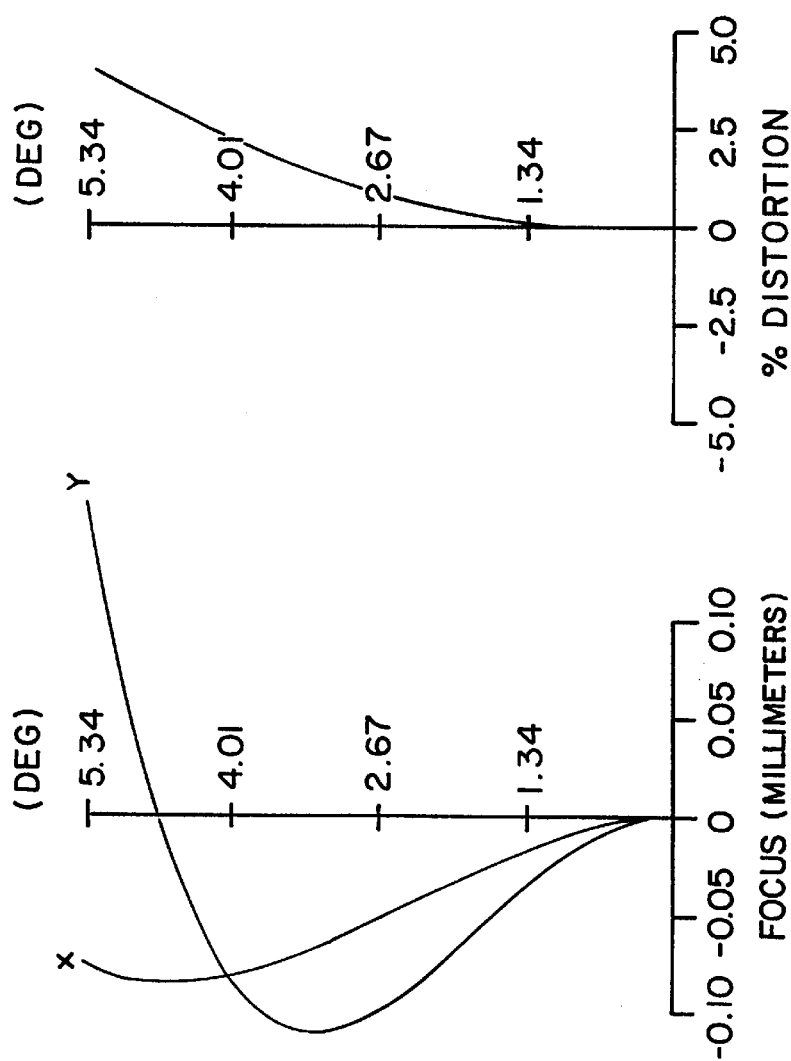
FIG. 4H ASTIGMATIC FIELD CURVES
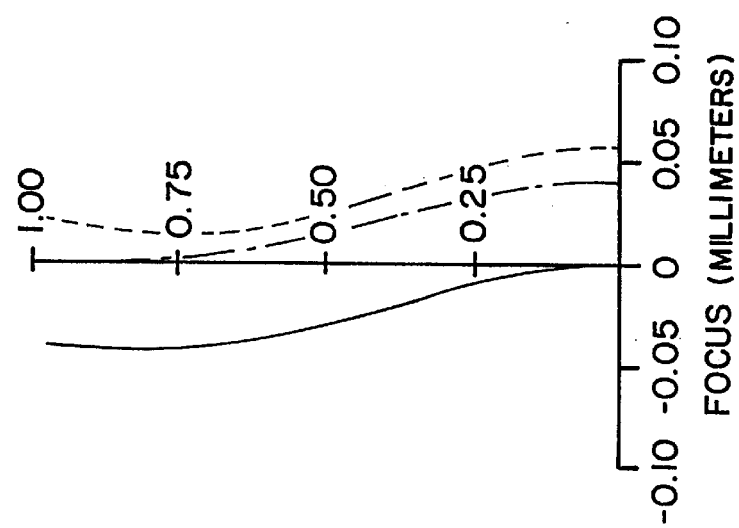
FIG. 4G LONGITUDINAL SPHERICAL ABER.

ZOOM LENS SYSTEM

BACKGROUND OF THE INVENTION

1. Field of the Invention

The present invention pertains to a zoom lens system, and more particularly, to a compact zoom lens system that is suitable for use as a photo-taking lens in a video camera or single lens reflex camera.

2. Description of the Related Art

Conventionally, zoom lens systems comprising a first lens unit having a positive refractive power, a second lens unit having a negative refractive power and at least one other lens unit have been known.

Among these zoom lens systems, those in which the first lens unit comprises at least three lenses and the second lens unit comprises at least two lenses have been proposed (e.g., U.S. Pat. No. 4,859,042).

Generally, in zoom lens systems, chromatic aberration must be adequately corrected in each lens unit. To do this, in a conventional zoom lens system, each lens unit must comprise at least two lenses having different dispersion values, which makes it extremely difficult to reduce the number of lenses in each lens unit and make the zoom lens system more compact.

SUMMARY OF THE INVENTION

The object of the present invention is to provide a zoom lens system that comprises a small number of lenses and in which chromatic aberration may be adequately corrected.

In order to attain the object described above, the present invention comprises a zoom lens system comprising, from the object side, a first lens unit having a positive refractive power, a second lens unit having a negative refractive power and at least one other lens unit, said zoom lens system having one or more of the following characteristics:

(1) At least one optical surface of a lens element comprising the first lens unit or at least one optical surface of a lens element comprising the second lens unit has a power to diffract a light and a power to refract a light;

(2) The optical surface of paragraph (1) includes a refractive optical surface which has the power to refract the light and is an aspherical surface;

(3) The optical surface of paragraph (1) includes a layer of resin which has the power to diffract the light and is formed on the refractive optical surface of paragraph (2), and the surface of said layer of resin has a sawtooth configuration;

(4) The optical surface of paragraph (1) above has a sawtooth configuration;

(5) The optical surface of paragraph (1) includes a layer of resin which has the power to diffract the light and is formed on the refractive optical surface of paragraph (2), and the surface of said layer of resin has a step configuration;

(6) The optical surface of paragraph (1) above has a step configuration.

By means of the above construction, the zoom lens system of the present invention may comprise a small number of lenses while its accompanying chromatic aberration is adequately corrected.

BRIEF DESCRIPTION OF THE DRAWINGS

The object and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 3A shows spherical aberration in the zoom lens system of embodiment 1 in the shortest focal length condition.

FIG. 3B shows astigmatism in the zoom lens system of embodiment 1 in the shortest focal length condition.

FIG. 3C shows distortion in the zoom lens system of embodiment 1 in the shortest focal length condition.

FIG. 3D shows spherical aberration in the zoom lens system of embodiment 1 in the middle focal length condition.

FIG. 3E shows astigmatism in the zoom lens system of embodiment 1 in the middle focal length condition.

FIG. 3F shows distortion in the zoom lens system of embodiment 1 in the middle focal length condition.

FIG. 3G shows spherical aberration in the zoom lens system of embodiment 1 in the longest focal length condition.

FIG. 3H shows the astigmatism in the zoom lens system of embodiment 1 in the longest focal length condition.

FIG. 3I shows distortion in the zoom lens system of embodiment 1 in the shortest focal length condition.

FIG. 4A shows spherical aberration in the zoom lens system of embodiment 2 in the shortest focal length condition.

FIG. 4B shows astigmatism in the zoom lens system of embodiment 2 in the shortest focal length condition.

FIG. 4C shows distortion in the zoom lens system of embodiment 2 in the shortest focal length condition.

FIG. 4D shows spherical aberration in the zoom lens system of embodiment 2 in the middle focal length condition.

FIG. 4E shows astigmatism in the zoom lens system of embodiment 2 in the middle focal length condition.

FIG. 4F shows distortion in the zoom lens system of embodiment 2 in the middle focal length condition.

FIG. 4G shows spherical aberration in the zoom lens system of embodiment 2 in the longest focal length condition.

FIG. 4H shows astigmatism in the zoom lens system of embodiment 2 in the longest focal length condition.

FIG. 4I shows distortion in the zoom lens system of embodiment 2 in the longest focal length condition.

DETAILED DESCRIPTION OF THE PREFERRED EMBODIMENTS

Note that, in the following descriptions, a power with which a diffractive optical element diffracts light is referred to as the diffractive power of the diffractive optical element, a power with which a refractive optical element refracts light is referred to as the refractive power of the refractive optical element, and the composition of the diffractive power and the refractive power is referred to as a composite power of the diffractive optical element and the refractive optical element.

Figure 1:
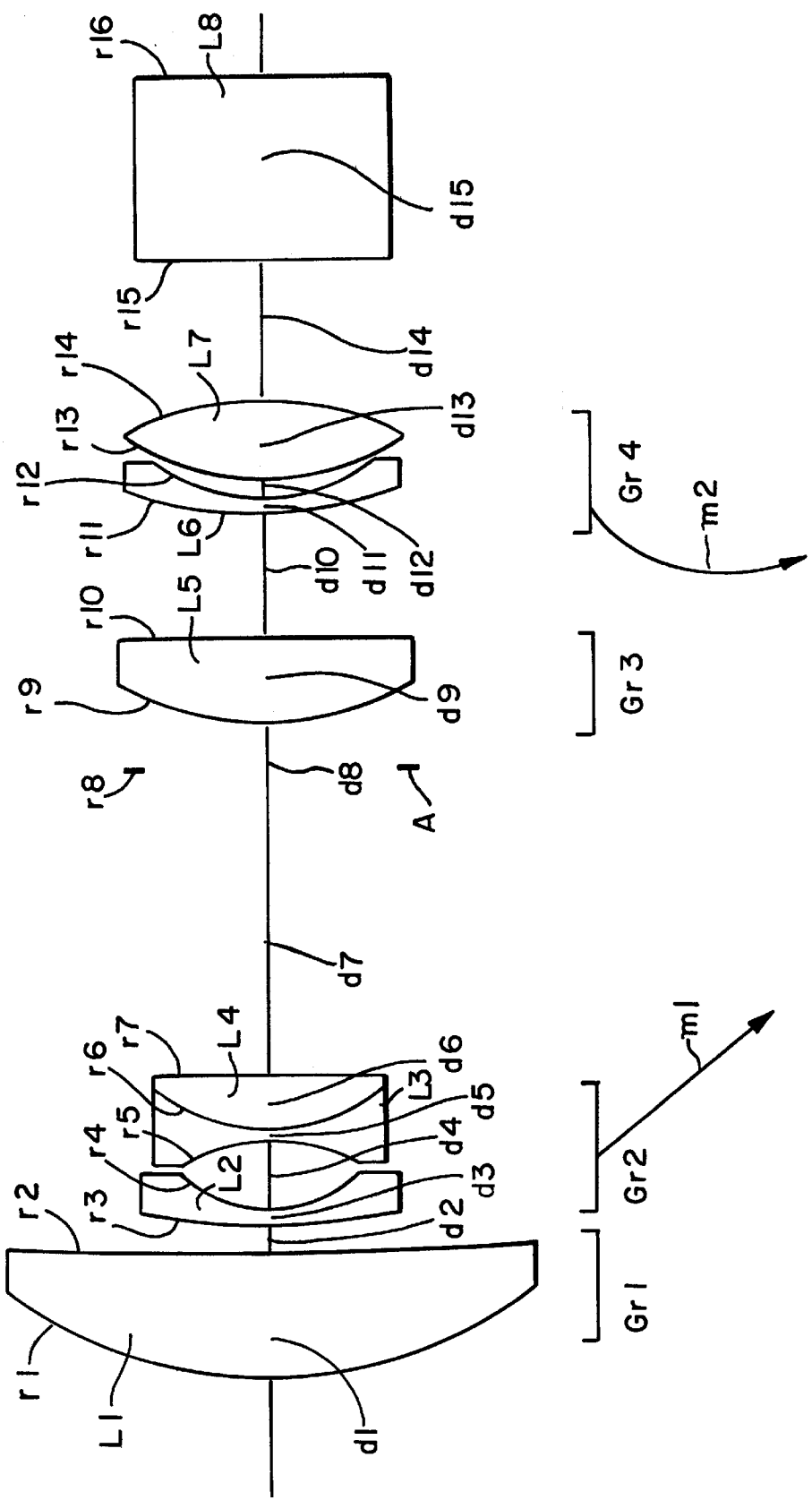
FIG. 1 shows the lens arrangement of a zoom lens system of embodiment 1 of the present invention in the shortest focal length condition.
Figure 2:
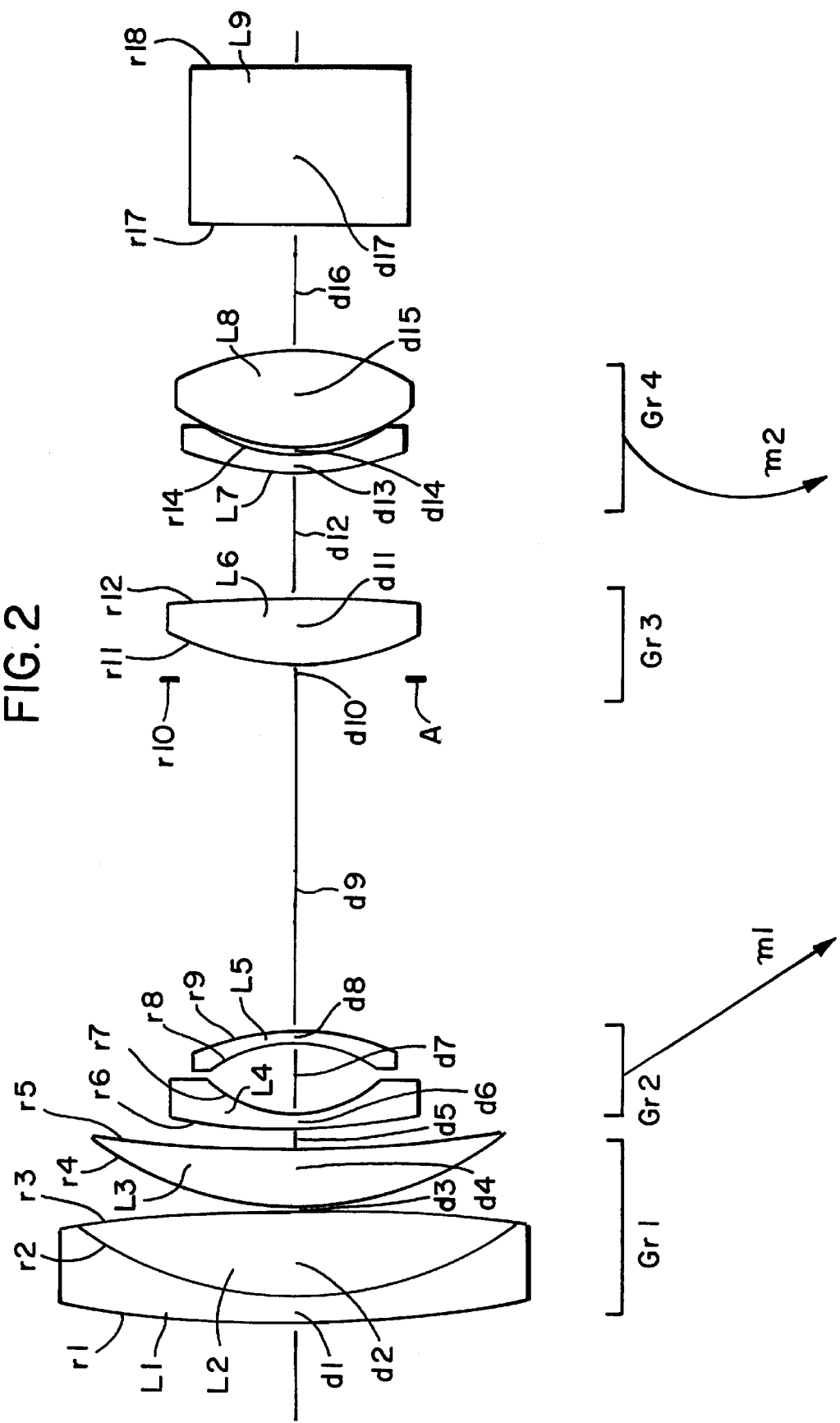
FIG. 2 shows the lens arrangement of a zoom lens system of embodiment 2 of the present invention in the shortest focal length condition.

The zoom lens systems of the embodiments of the present invention are explained below. FIGS. 1 and 2 show the lens arrangements in the zoom lens systems of the first and second embodiments, respectively, in the shortest focal length condition. The zoom lens systems of the embodiments are both zoom lens systems for use in a video camera.

The zoom lens systems of the first and second embodiments each comprise, from the object side, first lens unit Gr1 having a positive refractive power, second lens unit Gr2 having a negative refractive power, third lens unit Gr3 having a positive refractive power and fourth lens unit Gr4 having a positive refractive power, and, during zooming from the shortest focal length condition to the longest focal length condition, second lens unit Gr2 is moved to the image side and fourth lens unit Gr4 is moved once to the object side and is then moved to the image side. In FIGS. 1 and 2, arrows m1 and m2 indicate in a simplified manner the movement of second lens unit Gr2 and fourth lens unit Gr4 during zooming from the shortest focal length condition to the longest focal length condition in the zoom lens systems of the embodiments, respectively.

The zoom lens system of the first embodiment comprises, from the object side, first lens unit Gr1 comprising first lens L1 which is a diffractive-refractive hybrid-type positive meniscus lens having a convex surface on the object side and an aspherical surface on the image side, in which a diffractive optical element is formed on the image side surface; second lens unit Gr2 comprising second lens L2 which is a negative meniscus lens having a convex surface on the object side, third lens L3 having concave surfaces on both sides, and fourth lens L4 which is a positive meniscus lens having a convex surface on the object side and whose convex surface on the object side is connected to the image side surface of third lens L3; third lens unit Gr3 comprising aperture A and fifth lens L5 having convex surfaces on both sides; and fourth lens unit Gr4 comprising sixth lens L6 which is a negative meniscus lens having a convex surface on the object side and seventh lens L7 having convex surfaces on both sides. Plate L8 located farthest to the image side is a low-cut filter.

The zoom lens system of the second embodiment comprises, from the object side, first lens unit Gr1 comprising first lens L1 which is a negative meniscus lens having a convex surface on the object side, second lens L2 which has convex surfaces on both sides and whose object side convex surface is connected to the image side surface of first lens L1, and third lens L3 which is a positive meniscus lens having a convex surface on the object side; second lens unit Gr2 comprising fourth lens unit L4 which is a negative meniscus lens having a convex surface on the object side and fifth lens L5 which is a diffractive-refractive hybrid-type negative meniscus lens having a concave surface on the object side and whose image side surface is an aspherical surface, in which a diffractive optical element is formed on the image side surface; third lens unit Gr3 comprising aperture A and sixth lens L6 having convex surfaces on both sides; and fourth lens unit Gr4 comprising seventh lens L7 which is a negative meniscus lens having a convex surface on the object side and eighth lens L8 having convex surfaces on both sides. Plate L9 located farthest to the image side is a low-cut filter.

The zoom lens system of the first embodiment has a diffractive optical element formed on one optical surface of a lens element comprising the first lens unit, and the zoom lens system of the second embodiment has a diffractive optical element formed on one optical surface of a lens element comprising the second lens unit. The diffractive optical element may be integrally formed with the base lens as a single unit, or a construction may be adopted in which a layer of resin is added to the base lens, as described below.

As described above, when a diffractive optical element is formed on one optical surface of a lens element in the first or second lens units in a zoom lens system comprising, from the object side, a first lens unit having a positive refractive power, a second lens unit having a negative refractive power, and at least one other lens unit having a positive refractive power, chromatic aberration, which is difficult to correct when the number of lenses is sought to be reduced in a conventional zoom lens system comprising refractive optical elements only, may be adequately corrected.

Generally, in the case of a thin lens system, axial chromatic aberration L that occurs in a lens unit that includes a diffractive optical element is expressed by the following equations:

$$L = \phi\text{ref}/\nu\text{ref} + \phi\text{def}/\nu\text{def} \quad (1)$$

$$\nu\text{ref} = (Nd-1)/(Ng-Nc) \quad (2)$$

$$\nu\text{def} = \lambda d/(\lambda g - \lambda c) = -2.67 \quad (3)$$

where,

L: axial chromatic aberration

φref: refractive power of refractive optical surface

νref: dispersion value of refractive optical surface

φdef: refractive power of diffractive optical element

νdef: dispersion value of diffractive optical element

Nd: refractive index of refractive optical surface on the lens optical axis with regard to the d-line Ng: refractive index of refractive optical surface on the lens optical axis with regard to the g-line Nc: refractive index of refractive optical surface on the lens optical axis with regard to the c-line λd: wavelength of the d-line λg: wavelength of the g-line λc: wavelength of the c-line As can be seen from equation (3), a diffractive optical element has a large negative dispersion (−2.67). In the zoom lens systems of the embodiments, chromatic aberration that occurs in the refractive optical element having a refractive optical surface is corrected via the diffractive optical element by taking advantage of this property of the diffractive optical element.

Generally, when correcting chromatic aberration in an optical system comprising refractive optical surfaces only, because the dispersion value is always positive, the only way to correct chromatic aberration is by combining an optical element having a positive refractive power and a refractive optical element having a negative refractive power, said optical elements having different dispersion values.

However, because one of the refractive optical elements used to perform chromatic aberration correction has a positive refractive power while the other refractive optical element has a negative refractive power, in order to combine multiple (e.g., two) refractive optical elements and obtain a desired combined refractive power, the absolute value of the refractive power of one of the optical elements must be larger than the absolute value of the refractive power of the other optical element. If, however, the absolute value of the refractive power of one of the refractive optical elements is larger than that of the combined refractive power of multiple refractive optical elements in this way, a high-order aberration easily occurs.

In contrast, where chromatic aberration is corrected by combining a refractive optical element and a diffractive optical element, because the diffractive optical element has a large negative dispersion value as described above, the composite power of the diffractive optical element and the refractive optical element used to perform chromatic aberration correction may both be positive or negative. Consequently, the absolute value of the refractive power of the refractive optical element may be made smaller than the composite power, and a high-order aberration does not easily occur.

Because in the zoom lens systems of the embodiments, the diffractive optical element is formed on one optical surface of a lens element of either the first lens unit or the second lens unit (the diffractive-refractive hybrid-type lens), chromatic aberration occurring on the refractive optical surface may be adequately corrected by means of said diffractive optical element. Moreover, in the zoom lens systems of the embodiments, it is not necessary to add any more lenses to perform said correction, and the entire zoom lens system may be made compact. The zoom lens system of the first embodiment has a first lens unit comprising a single diffractive-refractive hybrid-type lens, and is extremely compact. The zoom lens of the second embodiment has one diffractive-refractive hybrid-type lens perform the function of a combination lens comprising two lenses, and is therefore compact as well as high-performance.

The refractive optical surface that has the power to refract the light to enter the lens surface on which the diffractive optical element is formed is aspherical in the embodiments.

If the construction described above is employed, when the diffractive optical element is manufactured through mechanical processing, the aspherical surface and the diffractive optical element may be processed simultaneously. This reduces the number of manufacturing processes and allows for precise processing as well.

Incidentally, the phase configuration of a diffractive optical element may generally be designed in various ways. It is possible to design a diffractive optical element surface that is optically identical to the aspherical refractive optical surface. In this way, not only chromatic aberration but also spherical aberration can be corrected by means of the diffractive optical element.

However, if spherical aberration correction is performed only by means of the phase configuration of the diffractive optical element, while spherical aberration in the design wavelength is corrected, larger chromatic spherical aberration occurs with regard to wavelengths other than the design wavelength, because the amount by which the light is bent via the diffraction varies.

In consideration of the problem described above, it is desirable to perform spherical aberration correction using a refractive optical surface. In the embodiments, good optical performance is attained by correcting spherical aberration and off-axial coma aberration by means of an aspherical refractive optical surface, and by correcting axial chromatic aberration and transverse chromatic aberration by means of a diffractive optical element formed on the refractive optical surface.

Further, it is also acceptable if the optical surface opposite to the optical surface on which a diffractive optical element is formed is made aspherical. By this construction, freedom in design increases and more aberration correction can be attained.

Figure 5:
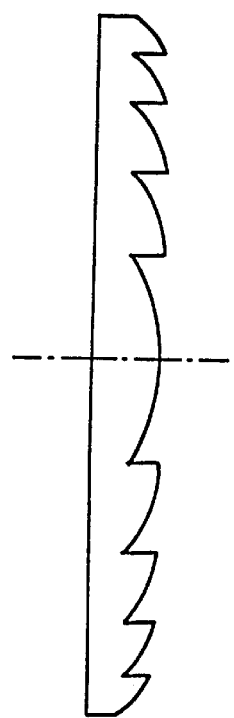
FIG. 5 is an enlarged view of the optical surface on which the diffractive optical element is formed in a sawtooth configuration.
Figure 6:
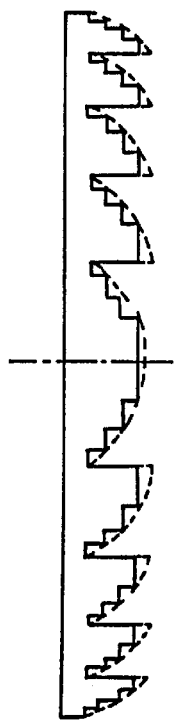
FIG. 6 is an enlarged view of the optical surface on which the diffractive optical element is formed in a step configuration.

While the diffractive optical element may have a sawtooth configuration (FIG. 5) or a step configuration (FIG. 6), by employing the sawtooth configuration, diffraction efficiency may be increased. A diffractive optical element having such a sawtooth configuration or step configuration may be manufactured by (1) creating a mold in a precise cutting process such that a glass or plastic material may be directly molded, or by (2) forming a layer of resin on a glass lens to form a diffractive optical element using this layer of resin. As for the step configuration (FIG. 6), a semiconductor manufacturing technology may be applied, e.g., the layer of resin on the glass surface may be processed using a laser beam (binary optics).

In the manufacturing of a diffractive optical element, any of the manufacturing methods described above may be used, but injection molding using plastic is the most effective in reducing the manufacturing cost. Chromatic aberration due to the dispersion of the plastic may be corrected via the diffractive optical element.

The conditions that the zoom lenses of the embodiments must meet are explained below.

$$2 < |R2 \cdot Hmax/\lambda 0| < 50 \tag{4}$$

where,

R2: secondary phase coefficient

Hmax: effective radius of the diffractive optical element $\lambda 0$: design wavelength Condition (4) must be met by the diffractive optical element of a zoom lens system comprising, from the object side, a first lens unit having a positive refractive power, a second lens unit having a negative refractive power and at least one other lens unit, when a diffractive optical element is formed on one optical surface of a lens element of either the first lens unit or the second lens unit. If the lower limit of this condition were exceeded, correction of chromatic aberration by the diffractive optical element would be inadequate, such that chromatic aberration in the lens unit on which the diffractive optical element is formed could not be corrected. Conversely, if the upper limit of this condition were exceeded, not only would chromatic aberration be overly corrected, but also the pitch in the peripheral areas of the diffractive optical element would become small and therefore an adequate diffractive effect could not be obtained. If the pitch of the diffractive optical element were to become too small, the manufacturing of the diffractive optical element would also become difficult.

$$0.2 \leq |\phi 1/\phi 2| \leq 0.4 \tag{5}$$

where $\phi 1$: composite power of the first lens unit $\phi 2$: refractive power of the second lens unit Condition (5) governs the first embodiment in which a diffractive optical element is formed on an optical surface of a lens element of the first lens unit, and must be met by the first and second lens units of a zoom lens system comprising, from the object side, a first lens unit having a positive composite power, a second lens unit having a negative refractive power and at least one other lens unit. If the upper limit of this condition were exceeded, the composite power of the first lens unit would become too strong, and correction of various types of aberration—spherical aberration and coma aberration in the longest focal length condition in particular—would become difficult. Conversely, if the lower limit of this condition were exceeded, the composite power of the first lens unit would become too weak, and therefore the length of the entire system would increase.

$$0.2 \leq |\phi/\phi 2| \leq 0.4 \tag{6}$$

where,

φ1: refractive power of the first lens unit

φ2: composite power of the second lens unit

Condition (6) governs the second embodiment in which a diffractive optical element is formed on an optical surface of a lens element of the second lens unit, and must be met by the first and second lens units of a zoom lens system comprising, from the object side, a first lens unit having a positive refractive power, a second lens unit having a negative composite power and at least one other lens unit. If the upper limit of this condition were exceeded, the refractive power of the first lens unit would become too strong, and correction of various types of aberration—spherical aberration and coma aberration in the longest focal length condition in particular—would become difficult. Conversely, if the lower limit of this condition were exceeded, the refractive power of the first lens unit would become too weak, and therefore the length of the entire system would increase.

$$1.0 \leq |\phi 2/\phi w| \leq 1.5 \tag{7}$$

where

φ2: refractive power of the second lens unit

φw: composite power of the entire system in the shortest focal length condition

Condition (7) governs the first embodiment in which a diffractive optical element is formed on an optical surface of a lens element of the first lens unit, and must be met by the second lens unit of a zoom lens system comprising, from the object side, a first lens unit having a positive composite power, a second lens unit having a negative refractive power, a third lens unit having a positive refractive power and a fourth lens unit having a positive refractive power. If the upper limit of this condition were exceeded, the refractive power of the second lens unit would become too strong, and therefore correction of aberration due to zooming would become difficult. Conversely, if the lower limit of this condition were exceeded, the refractive power of the second lens unit would become too weak. Consequently, the length of the entire system would increase and the amount of movement of the lens units would increase during zooming, so that a compact zoom lens system could not be attained.

$$1.0 \leq |\phi 2/\phi w| \leq 1.5 \tag{8}$$

where,

φ2: composite power of the second lens unit

φw: composite power of the entire system in the shortest focal length condition

Condition (8) governs the second embodiment in which a diffractive optical element is formed on an optical surface of a lens element of the second lens unit, and must be met by the second lens unit of a zoom lens system comprising, from the object side, a first lens unit having a positive refractive power, a second lens unit having a negative composite power, a third lens unit having a positive refractive power and a fourth lens unit having a positive refractive power. If the upper limit of this condition were exceeded, the composite power of the second lens unit would become too strong and therefore correction of aberrations due to zooming would become difficult. Conversely, if the lower limit of this condition were exceeded, the composite power of the second lens unit would become too weak. Consequently, the length of the entire system would increase and the amount of movement of the lens units during zooming would increase, so that a compact zoom lens system could not be attained.

The zoom lens systems pertaining to the present invention are more specifically shown with construction data, drawings of types of aberration, etc. Embodiments 1 and 2 shown below correspond to the first and second embodiments described above. The lens arrangement drawings showing the first and second embodiments show the lens arrangements of the corresponding embodiments 1 and 2, respectively.

In the embodiments, ri (i=1, 2, 3, . . . ) represents the radius of curvature of the ith surface from the object side; di (i=1, 2, 3, . . . ) represents the ith axial distance from the object side; Ni (i=1, 2, 3, . . . ), and vi (i=1, 2, 3, . . . ) represent the refractive index and the Abbe number with regard to the d-line of the ith lens from the object side, respectively. The letter E attached to the numeric data of the embodiments represents the exponent of the number to which the letter is attached. For example, 1.0×10E02 means $1.0 \times 10^2$.

Focal length f and F-number FNO of the entire zoom lens system and the distance between the first lens unit and the second lens unit (axial distance d5) in the shortest focal length condition (W), the middle focal length condition (M) and the longest focal length condition (T) are also shown in that order from the left.

In the embodiments, the surfaces marked with asterisks in the radius of curvature column are aspherical, and are defined by the following equation that represents the aspherical surface configuration.

$$Y = \frac{c \cdot x^2}{1 + \sqrt{1 - \epsilon \cdot x^2 \cdot c^2}} + \Sigma_i A i x^i$$

where,

X: height in the direction perpendicular to the optical axis

Y: amount of displacement from the reference surface along the optical axis

C: paraxial curvature

ε: quadric surface parameter

Ai: the ith aspherical coefficient

In the embodiments, the surfaces marked with (HOE) in the radius of curvature column are the surfaces on which a diffractive optical element is formed. The phase configuration that determines the pitch of the diffractive optical element is defined by the following equation.

$$\phi(X) = 2\pi \cdot \left( \Sigma_i Ri \cdot x^i \right) / \lambda 0$$

where,

φ(X): phase function

Ri: the ith phase coefficient

X: height in the direction perpendicular to the optical axis

FIG. 3A shows spherical aberration in the zoom lens system of embodiment 1 in the shortest focal length condition. FIG. 3B shows astigmatism in the zoom lens system of embodiment 1 in the shortest focal length condition. FIG. 3C shows distortion in the zoom lens system of embodiment 1 in the shortest focal length condition. FIG. 3D shows spherical aberration in the zoom lens system of embodiment 1 in the middle focal length condition. FIG. 3E shows astigmatism in the zoom lens system of embodiment 1 in the middle focal length condition. FIG. 3F shows distortion in the zoom lens system of embodiment 1 in the middle focal length condition. FIG. 3G shows spherical aberration in the zoom lens system of embodiment 1 in the longest focal length condition. FIG. 3H shows astigmatism in the zoom lens system of embodiment 1 in the longest focal length condition. FIG. 3I shows distortion in the zoom lens system of embodiment 1 in the shortest focal length condition. FIG. 4A shows spherical aberration in the zoom lens system of embodiment 2 in the shortest focal length condition. FIG. 4B shows astigmatism in the zoom lens system of embodiment 2 in the shortest focal length condition. FIG. 4C shows distortion in the zoom lens system of embodiment 2 in the shortest focal length condition. FIG. 4D shows spherical aberration in the zoom lens system of embodiment 2 in the middle focal length condition. FIG. 4E shows astigmatism in the zoom lens system of embodiment 2 in the middle focal length condition. FIG. 4F shows distortion in the zoom lens system of embodiment 2 in the middle focal length condition. FIG. 4G shows spherical aberration in the zoom lens system of embodiment 2 in the longest focal length condition. FIG. 4H shows astigmatism in the zoom lens system of embodiment 2 in the longest focal length condition. FIG. 4I shows distortion in the zoom lens system of embodiment 2 in the shortest focal length condition.

In the drawings showing spherical aberration, the solid line represents aberration with regard to the d-line, the dotted line shows aberration with regard to the c-line and the chain line shows aberration with regard to the g-line. In the drawings showing astigmatism, solid line (Y) and solid line (X) represent astigmatism on the meridional plane and sagittal plane, respectively.

Embodiments 1 and 2 meet conditions (4) through (8) shown above. Values of embodiments 1 and 2 that meet conditions (4) through (8) are shown in Table 3 below. In condition (4), design wavelength $\lambda 0$ is 587.6 nm (d-line).

As explained above, using the present invention, a zoom lens system which comprises a small number of lenses and in which chromatic aberration is adequately corrected may be provided.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein. Drawings of the embodiments and Tables 1, 2 and 3 are shown below.

TABLE 1

<First Embodiment>
f = 4.5~12~25.7    FNO = 1.85~2.14~2.65

|  | Radius | Axial Surface Distance | Refractive Index | Abbe Number |
|---|---|---|---|---|
| r1 | −11.344 | | | |
|  |  | d1 3.504 | N1 1.67000 | v1 57.1 |
| r2*(HOE) | −341.966 | | | |
|  |  | d2 0.700~5.398~8.023 | | |
| r3 | 19.514 | | | |
|  |  | d3 0.374 | N2 1.88300 | v2 40.8 |
| r4 | 3.295 | | | |
|  |  | d4 1.729 | | |
| r5 | −4.984 | | | |
|  |  | d5 0.374 | N3 1.61742 | v3 52.2 |
| r6 | 5.259 | | | |
|  |  | d6 1.270 | N4 1.84666 | v4 23.8 |
| r7 | 222.361 | | | |
|  |  | d7 8.169~3.800~1.009 | | |
| r8 | ∞(絞り) | | | |
|  |  | d8 0.901 | | |
| r9 | 6.995 | | | |
|  |  | d9 2.171 | N5 1.58913 | v5 61.3 |
| r10 | −684.801 | | | |
|  |  | d10 3.230~0.980~2.532 | | |
| r11 | 12.255 | | | |
|  |  | d11 0.400 | N6 1.84666 | v6 23.8 |
| r12 | 5.404 | | | |
|  |  | d12 0.342 | | |
| r13 | 6.690 | | | |
|  |  | d13 2.000 | N7 1.58913 | v7 61.3 |
| r14* | −6.753 | | | |
|  |  | d14 3.740 | | |
| r15 | ∞ | | | |
|  |  | d15 4.870 | N8 1.51680 | v8 64.2 |
| r16 | ∞ | | | |

| r2 | r9 | r14 |
|---|---|---|
| Aspherical Coefficient | | |
| ε = 1.0000 | ε = 1.0000 | ε = 1.0000 |
| A4 = 1.2512E − 04 | A4 = −0.535529E − 03 | A4 = 0.297404E − 03 |
| A6 = −2.1113E − 06 | A6 = −0.298720E − 04 | A6 = −0.302137E − 04 |
| A8 = 2.6010E − 08 | A8 = 0.239242E − 05 | A8 = 0.198307E − 05 |
|  | A10 = −0.901516E − 07 | A10 = −0.166219E − 06 |
| Phase Coefficient | | |
| R2 = −1.6167E − 03 | | |
| R4 = −2.4880E − 05 | | |
| R6 = 1.2244E − 06 | | |

TABLE 2

<Second Embodiment>
f = 4.5~12~25.7    FNO = 1.85~2.14~2.65

|  | Radius | Axial Surface Distance | Refractive Index | Abbe Number |
|---|---|---|---|---|
| r1 | 36.468 | | | |
|  |  | d1 0.800 | N1 1.80518 | v1 25.5 |
| r2 | 11.183 | | | |
|  |  | d2 2.500 | N2 1.60311 | v2 60.7 |
| r3 | −69.566 | | | |
|  |  | d3 0.140 | | |
| r4 | 10.553 | | | |
|  |  | d4 1.600 | N3 1.80420 | v3 46.5 |
| r5 | 38.408 | | | |
|  |  | d5 0.630~5.040~7.605 | | |
| r6 | 21.894 | | | |
|  |  | d6 0.375 | N4 1.88300 | v4 40.8 |
| r7 | 4.176 | | | |
|  |  | d7 1.909 | | |
| r8 | −4.673 | | | |
|  |  | d8 0.300 | N5 1.51742 | v5 52.2 |
| r9*(HOE) | −10.560 | | | |

TABLE 2-continued

<Second Embodiment>
f = 4.5~12~25.7  FNO = 1.85~2.14~2.65

| | | | | | |
|---|---|---|---|---|---|
| | | d9 | 9.358~4.629~1.882 | | |
| r10 | ∞(絞り) | | | | |
| | | d10 | 0.900 | | |
| r11* | 7.385 | | | | |
| | | d11 | 1.832 | N6 1.58913 | ν6 61.3 |
| r12 | −63.847 | | | | |
| | | d12 | 3.738~1.938~3.738 | | |
| r13 | 11.809 | | | | |
| | | d13 | 0.374 | N7 1.84666 | ν6 23.8 |
| r14 | 4.833 | | | | |
| | | d14 | 0.188 | | |
| r15 | 5.535 | | | | |
| | | d15 | 2.808 | N8 1.58913 | ν7 61.3 |
| r16* | −8.788 | | | | |
| | | d16 | 3.740 | | |
| r17 | ∞ | | | | |
| | | d17 | 4.870 | N9 1.51680 | ν8 64.2 |
| r18 | ∞ | | | | |

| r9 | r11 | r16 |
|---|---|---|
| Aspherical Coefficient | | |
| ε = 1.0000 | ε = 1.0000 | ε = 1.0000 |
| A4 = | A4 = | A4 = |
| −1.2232E − 03 | −0.734653E − 03 | −0.217943E − 03 |
| A6 = | A6 = | A6 = |
| 2.4689E − 05 | 0.111807E − 04 | 0.927535E − 04 |
| A8 = | A8 = | A8 = |
| −7.5723E − 06 | 0.262261E − 06 | −0.144048E − 04 |
| | A10 = | A10 = |
| | −0.621210E − 07 | 0.534841E − 06 |
| | Phase Coefficient | |
| R2 = 5.8309E − 03 | | |
| R4 = 1.2000E − 05 | | |
| R6 = 3.1648E − 05 | | |

TABLE 3

| Conditional Expression | First Embodiment | Second Embodiment |
|---|---|---|
| 2 < \| R2 · Hmax/γ0 \| < 50 | 15.82 | 25.7 |
| 0.2 < \|φ1/φ2\| < 0.4 | 0.229 | 0.260 |
| 1.0 < \|φ2/φw\| < 1.5 | 1.249 | 1.186 |

What is claimed is:

1. A zoom lens system comprising, from the object side:
a first lens unit having a positive refractive power and including a lens element;
a second lens unit having a negative refractive power; and at least one other lens unit;
and wherein zooming operation is performed by varying distances between said first, second, and the at least one other lens unit;
and wherein at least one optical surface of said lens element has a power to diffract a light and a power to refract light.

2. A zoom lens system as claimed in claim 1, wherein said optical surface includes a refractive optical surface which has the power to refract the light and is an aspherical surface.

3. A zoom lens system as claimed in claim 2, wherein said optical surface includes a layer of resin which has the power to diffract the light and is formed on said refractive optical surface, and a surface of said layer of resin has a sawtooth configuration.

4. A zoom lens system as claimed in claim 1, wherein said optical surface has a sawtooth configuration.

5. A zoom lens system as claimed in claim 2, wherein said optical surface includes a layer of resin which has the power to diffract the light and is formed on said refractive optical surface, and a surface of said layer of resin has a step configuration.

6. A zoom lens system as claimed in claim 1, wherein said optical surface has a step configuration.

7. A zoom lens system as claimed in claim 1, wherein the following conditions is fulfilled:

$$2 < |R2 \cdot Hmax/\lambda 0| < 50$$

where R2 is secondary phase coefficient, Hmax is effective radius of the diffractive optical element and λ0 is design wavelength.

8. A zoom lens system as claimed in claim 1, wherein the following conditions is fulfilled:

$$0.2 \leq |\phi 1/\phi 2| \leq 0.4$$

where φ1 is composite power of the first lens unit and φ2 is refractive power of the second lens unit.

9. A zoom lens system as claimed in claim 1, wherein said at least one other lens unit are composed of a third lens unit having a positive refractive power and a forth lens unit having a positive refractive power and further the following conditions is fulfilled:

$$1.0 \leq |\phi 2/\phi w| \leq 1.5$$

where φ2 is refractive power of the second lens unit and φw is composite power of the entire system in the shortest focal length condition.

10. A zoom lens system comprising, from the object side:
a first lens unit having a positive refractive power;
a second lens unit having a negative refractive power and including a lens element;
and at least one other lens unit;
and wherein zooming operation is performed by varying distances between said first and second and the at least one other lens unit:
wherein at least one optical surface of said lens element has a power to diffract a light and a power to refract light,
and wherein the following condition is fulfilled:

$$2 < |R2 \cdot Hmax/\lambda 0| < 50$$

where R2 is the secondary phase coefficient, Hmax is the effective radius of the diffractive optical element, λ0 is the design wavelength.

11. A zoom lens system as claimed in claim 10, wherein said optical surface includes a refractive optical surface which has the power to refract the light and is an aspherical surface.

12. A zoom lens system as claimed in claim 11, wherein said optical surface includes a layer of resin which has the power to diffract the light and is formed on said refractive optical surface, and a surface of said layer of resin has a sawtooth configuration.

13. A zoom lens system as claimed in claim 10, wherein said optical surface has a sawtooth configuration.

14. A zoom lens system as claimed in claim 11, wherein said optical surface includes a layer of resin which has the power to diffract the light and is formed on said refractive optical surface, and a surface of said layer of resin has a step configuration.

15. A zoom lens system as claimed in claim 10, wherein said optical surface has a step configuration.

16. A zoom lens system as claimed in claim 10, wherein the following conditions is fulfilled:

$$0.2 \leq |\phi 1/\phi 2| \leq 0.4$$

where $\phi 1$ is refractive power of the first lens unit and $\phi 2$ is composite power of the second lens unit.

17. A zoom lens system as claimed in claim 10, wherein said at least one other lens unit are composed of a third lens unit having a positive refractive power and a forth lens unit having a positive refractive power and further the following conditions is fulfilled:

$$1.0 \leq |\phi 2/\phi w| \leq 1 0.5$$

where $\phi 2$ is composite power of the second lens unit and $\phi w$ is composite power of the entire system in the shortest focal length condition.

18. A zoom lens system comprising, from the object side:

a first lens unit having a positive refractive power and including a first lens element;

a second lens unit having a negative refractive power and including a second lens element;

and at least one other lens unit;

and wherein zooming operation is performed by varying distances between said first, second, and at least one other lens unit;

and wherein an optical surface both of said first lens element and said second lens element have a power to diffract a light and a power to refract light.

19. A zoom lens system comprising, from the object side:

a first lens unit having a positive refractive power and including a lens element with a power to diffract light and a power to refract light;

a second lens unit having a negative refractive power;

a third lens unit having a positive refractive power; and a fourth lens unit having a positive refractive power, wherein the following condition is fulfilled:

$$1.0 \leq |\emptyset 2/\emptyset w| \leq 1.5$$

where $\emptyset 2$ is the composite power of the second lens unit, and $\emptyset w$ is the composite power of the entire lens system in the shortest focal length condition.

20. A zoom lens system comprising, from the object to image side:

a first lens unit having a positive refractive power;

a second lens unit having a negative refractive power, one of the first and second lens units includes a lens element with an aspherical refractive optical surface on an image side with a surface configuration, which diffracts light to correct chromatic aberration, wherein the following condition is met:

$$2 \leq |R_2 \cdot Hmax/\lambda 0| < 50$$

wherein $R_2$ is the secondary phase coefficient, Hmax is the effective radius on the diffractive optical element, and $\lambda 0$ is the design wavelength;

a third lens unit; and a fourth lens unit wherein a zooming operation is performed by varying the distances between the respective first, second, third, and fourth lens units.

* * * * *